May 8, 1928.
E. A. WHITE
SIZING APPARATUS
Filed Dec. 14, 1926
1,668,665
2 Sheets-Sheet 1
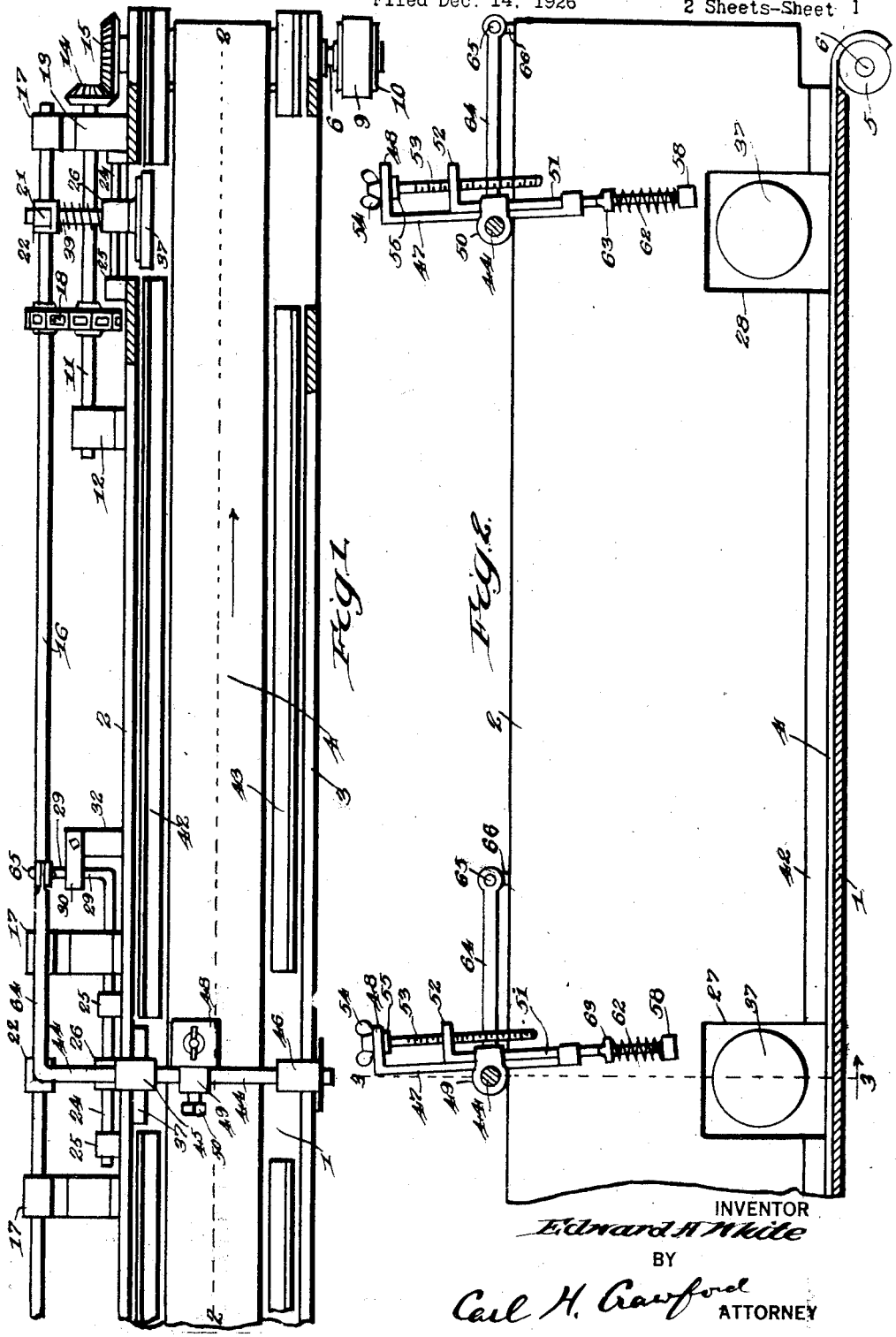
INVENTOR
Edward H White
BY
Carl H. Crawford
ATTORNEY May 8, 1928.
E. A. WHITE
SIZING APPARATUS
Filed Dec. 14, 1926
1,668,665
2 Sheets-Sheet 2
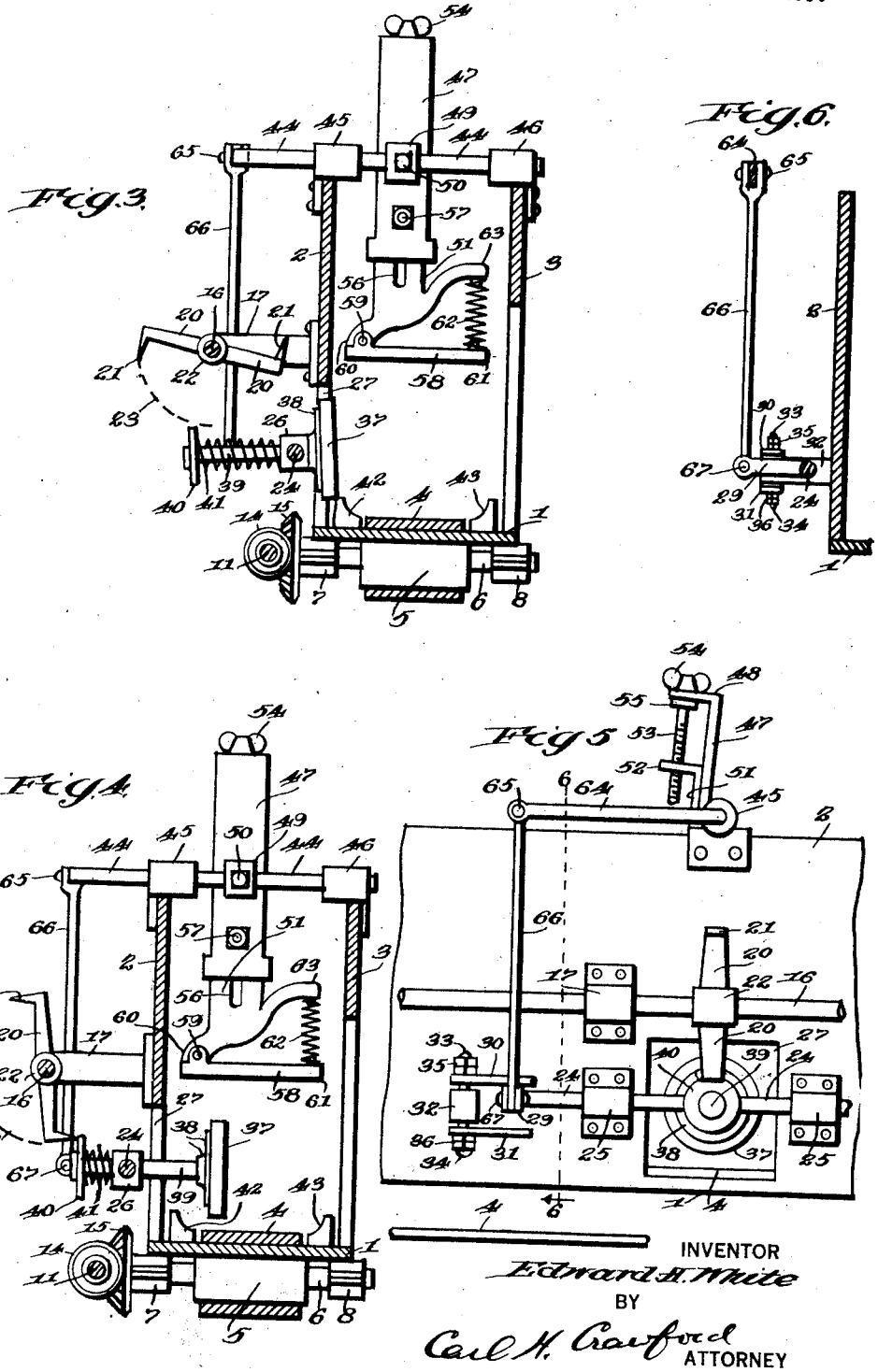
INVENTOR
Edward A. White
BY
Carl H. Crawford
ATTORNEY Patented May 8, 1928.

1,668,665

UNITED STATES PATENT OFFICE.

EDWARD A. WHITE, OF LEWISTON, IDAHO.

SIZING APPARATUS.

Application filed December 14, 1926. Serial No. 154,739.

The object of this invention is to provide an improved sizing apparatus for fruit.

The invention has to do with that class of apparatus of this character in which a conveyor trough is provided with a fruit advancing belt and wherein fruit of a given size is ejected laterally of the trough at predetermined locations.

It is an object of the invention to provide positively operated mechanism for quickly and effectively ejecting the fruit entities, at prescribed points, without relying upon the tractive engagement of the fruit on the belt for the performance of this ejecting function.

A feature of the invention resides in means of an easily operable nature being disposed in the path of movement of the fruit to be actuated thereby to a very limited extent, and under the imposition of a very slight thrust, for the purpose of initiating operation of ejecting mechanism that is normally idle and which is power driven.

A further feature of the invention resides in a novel form of ejecting means which not only acts quickly in the performance of its ejecting function, but which also is just as quickly withdrawn or retracted thereby affording high speed efficiency and avoiding the necessity of longitudinal spacing of the fruit on the belt.

A further feature consists of an improved gate structure adapted to be actuated by the fruit and having yielding means collapsible in the plane of the gate, and broadly speaking, yieldingly mounted, so that in the event that a certain size fruit entity is not quite large enough to actuate the gate, it can pass thereunder, without clogging the operation.

My invention has many other features and advantages which will be more fully described in connection with the accompanying drawings and which will be more particularly pointed out in and by the appended claims.

In the drawings:

Fig. 1, is a plan view of one form of my improved sizing apparatus showing two ejecting devices.

Fig. 2, is a sectional view on line 2—2 thereof.

Fig. 3, is a sectional view on line 3—3 of Fig. 2, with the ejecting plunger in an idle position.

Fig. 4, is a view similar to Fig. 3, showing the plunger in the act of ejecting a fruit entity.

Fig. 5, is a view looking from the left of Fig. 4.

Fig. 6, is a sectional view on line 6—6 of Fig. 5.

Like characters of reference designate similar parts throughout the different figures of the drawings.

As shown, the device of my invention includes a trough having a bottom wall 1, an ejector side wall 2 and a delivery side wall 3. A fruit advancing belt is provided and the upper lap 4, thereof, travels on the bottom 1 and advances fruit to the right of Figs. 1 and 2, as indicated by the arrow. I have shown a pulley 5, mounted on shaft 6, journalled in suitable bearings 7 and 8, and over which the right hand bight of the belt is trained. Power may be applied by belt 9, trained over pulley 10, on said shaft 6. A counter shaft 11, journalled in bearings 12 and 13, carries a bevelled gear 14 which meshes with a bevelled gear 15, on shaft 6, whereby shaft 11, is driven.

It is a feature of this invention to provide power driven means for effecting ejection of the fruit, which I will next describe in detail.

A shaft 16 is journalled in suitable bearings 17, mounted on wall 2, and this shaft may be driven by a reduction gear such as sprocket chain 18, trained over suitable sprocket wheels on shafts 11 and 16. This driving ratio, in addition to the driving ratio shown at 14 and 15, results in a rapid rotation of shaft 16, which I will term the constantly operating plunger actuating shaft since this shaft 16 is arranged to actuate all of the plungers of the apparatus. For each plunger, shaft 16 has one or more plunger actuating arms. As shown in Fig. 3, two arms 20 are employed, each having a projecting wiping contact end 21, and said arms being mounted on a hub 22, secured to said shaft 16. The range or sweep of arms 20, is indicated by the circular dotted line 23.

Reference will next be made to the fruit ejecting plunger.

A plunger rock shaft 24, is disposed parallel with wall 2, and is journalled in suitable bearings 25 and is provided with a plunger stem supporting boss 26. The wall 2, is provided with suitable openings 27 and 28, for projection therethrough of the plungers which I am now about to describe. Said rock shaft 24, is provided with a stop arm 29, which extends between stops 30 and 31, for limiting oscillating movement of said rock shaft 24. Said stops 30 and 31, may be mounted on a boss 32, in a manner to be adjustable, as by means of oppositely disposed threaded rods 33 and 34, and nuts 35 and 36. My improved plunger consists of a plunger head 37, which may be made of felt or like yielding material, the same being mounted on a flange 38, secured to a stem 39. Stem 39, is slidably mounted in boss 26, to move or be moved transversely across the belt 4, for the purpose of ejecting a fruit entity. On the outer end of said stem 39, is what I will term a plunger actuating element 40, which may consist of a washer suitably secured to said stem. In order to provide for retraction of the power actuated plunger, I employ an expansively acting spring 41, which is trained about stem 39 and is interposed between boss 26 and element 40, to normally hold the plunger in the retracted position shown in Fig. 3. The arrangement is such that the greater weight of the stem 39, projecting to the left of shaft 24, together with other parts to be described, will cause said plunger and its shaft to tilt downwardly by gravity into what is herein shown as an inclination to the horizontal but which is, in any event, a position such as will dispose the stem out of operative relation with its actuating mechanism, as shown in Fig. 3. In this retracted position, the stop arm 29, would be limited by engagement with stop 31. As shown in Fig. 5, the plunger is operative, and hence arm 29 engages stop 30. In the present construction, I have shown side rails 42 and 43, on opposite sides of belt 4, and I have shown these rails suitably interrupted at points where the plunger is to be projected and where fruit is to be ejected.

I will next describe fruit actuated means, the purpose of which is to initiate operation of the heretofore described ejecting mechanism.

A gate shaft 44, is journalled in bearings 45 and 46, mounted on walls 2 and 3, respectively. A gate structure is adjustably mounted on shaft 44 and comprises a supporting member 47 in the form of an inverted L-shaped strip having a projecting flange 48, and provided with a boss 49, through which shaft 44 extends. A set screw 50, serves to secure the device in the proper rotative and longitudinal position on said shaft. Said structure includes a gate member 51, also in the form of an inverted L-shaped strip, the same having a flange 52 in which an adjusting screw 53 is threaded. Said screw is freely rotatable in flange 48 and carries a thumb-nut 54 on its upper end and is held against longitudinal movement upwardly by a collar 55. Thus it will be seen that when nut 54 is rotated in one or the other of two directions, the gate member will be longitudinally adjusted with respect to its supporting member, thereby varying the relation of the bottom of the gate member with respect to belt 4. Said member 51 is provided with a slot 56 and a bolt 57, extending through said members may additionally serve to guide the same in their relatively adjusted positions. The gate member 51 is provided on its lower end with a yieldingly mounted fruit engaging member which is shown in the form of a bar 58, the same being pivoted at 59 to said member at such a point inside the left hand end of said bar (Fig. 3) that engagement of the extreme left end with member 51, at 60, will prevent the right hand end 61, of said bar from descending below the position shown. A spring 62, is interposed between the end 61 and an extending portion 63, of the gate member, so that when it is necessary for said bar to yield, a sufficient upward movement is afforded about 59 as a center. However, such upward movement cannot result from a lateral thrust on bar 58 but only when a thrust upwardly from below, is exercised. Thus, it will be clear that in no event could an apple or other fruit entity become wedged between the belt 4 and the bar 58.

Reference will next be made to the means and manner whereby movement of the gate structure will initiate operation of the power driven plunger mechanism.

Shaft 44 is bent to form a crank section 64 which is pivoted at 65 to the upper end of a link 66. The lower end of said link 66 is pivotally connected at 67, with stop arm 29, see Fig. 6. Thus, it will be seen that the weight of 64 and 66, will additionally tend to tilt the outer end of stem 39, downwardly as shown in Fig. 3, and further, it will be noted that when the gate structure is actuated by an apple, the lower end is swung to the right of Fig. 2, away from the vertical, and the tendency is for it to return toward a vertical position by gravity. Hence, the preponderance of weight of the several parts will quickly restore the stem 39, from the horizontal position shown in Fig. 4, to the inclined position shown in Fig. 3. Viewing Fig. 5, it will be seen that an apple has actuated the lower end of the gate and tilted the same in a clockwise direction lifting crank 64 and consequently rocking shaft 24 in a clockwise direction, viewing Fig. 3, thereby swinging the plunger into a horizontal position. Such movement of the plunger elevates element 40, into the path of one of the arms 20, causing the latter quickly to project the plunger 37 across the belt 4. This quick impact of the plunger 37, with an apple or other fruit entity, serves to eject the latter completely off from and laterally of belt 4.

It will be noted from Fig. 2, that the plungers 37 are in line with the fruit entity that actuated the gate and as the actuating movement of the latter is very slight, the plunger will have ample time to completely eject the entity. Just as soon as the apple has been ejected, the gate returns to its initial position thereby lowering the outer end of the stem 39 out of the path of arms 20, and the spring instantly acts to retract the plunger to the position shown in Fig. 3. In fact, in actual practice, the restoring action of the parts is so quickly effected that if two apples were in abutting relation, one behind the other, on belt 4, and both of a size to be ejected, then both would be ejected without any inaccuracy of the mechanism.

Viewing Fig. 2, and assuming that the first gate is at the extreme left, then such gate will be adjusted high, to size the largest size fruit, and the next following gates to the right, will be adjusted consecutively lower for the smaller sized fruit. Thus, a small or medium size apple would pass clear of the first gate or gates and would not trip or actuate a gate until it reached the gate for the ejection of that particular sized apple.

It will now be clear that by reason of the rapid and accurate ejection possible with my device, I can not only operate the fruit belt at a higher rate of speed, but if necessary, I can locate the ejecting devices in closer relation than was heretofore possible. However, the greatest advantage is that I do not have to be so careful in spacing the apples on the fruit belt at any predetermined distance apart. In fact, I can run the fruit on the belt in the indiscriminate order in which they are loaded by the operatives without employing any spacing devices, and even in this event, I could greatly speed up the belt.

A further and very material advantage, which will now be clear, is that I do not depend upon the tractive power of the fruit to eject itself from the advancing belt. All the fruit is called upon to do, is to actuate the trip gate, which is such a light duty that the lightest weight apple or other fruit entity can readily perform it, whereupon, the real service of ejection is performed by power driven means wholly independent of the fruit. In cases where fruit is used to actute an ejecting device to effect ejection of the fruit, a much lower rate of speed is necessary, as compared to the present invention, and many times, the lighter fruit entities fail to actuate the ejecting devices, thereby resulting in clogging the trough.

It is now believed that the device of my invention will be fully understood from the foregoing description, and while I have herein shown and described one specific form of my invention, I do not wish to be limited to the specific disclosure made except for such limitations as the claims may import.

I claim:

1. In a fruit sizing apparatus, a conveyor trough, a fruit advancing belt in said trough, an ejector rock shaft mounted parallel with said trough and having a stop arm, a fruit ejecting plunger having a stem slidable through said rock shaft for movement of said plunger transversely across said belt to eject the fruit, the outer end of said stem having an actuating element thereon, an expansively acting spring on said stem interposed between said rock shaft and said element to normally retract said plunger, stops limiting oscillating movement of said stop arm, a constantly rotating plunger actuating shaft having plunger arms for engagement with said element to operate said plunger and being normally free therefrom, and a trip gate pivoted on said trough and having a lower end in the path of the fruit of a certain size to be actuated thereby and provided with a crank connected with said stop arm to rock said stem and dispose the actuating element thereof into the path of said plunger arms to actuate said plunger.

2. In a fruit sizing apparatus, a conveyor trough, a fruit advancing belt therein, an ejector rock shaft mounted parallel with said trough, a fruit ejecting plunger having a stem longitudinally slidable through said rock shaft for movement of said plunger transversely across said belt to eject the fruit, a spring normally retracting said plunger, means for limiting oscillating rocking movement of said rock shaft, a rotating plunger arm normally free from said stem, and a trip gate rockingly mounted on said trough in the path of the fruit and having means for rocking said ejector shaft to dispose said stem in the path of said plunger arm to actuate said plunger and eject a fruit entity.

3. In a fruit sizing apparatus, a conveyor trough, a fruit advancing belt therein, an ejector rock shaft mounted parallel with said trough and oscillatable about its own axis, a fruit ejecting plunger having a stem slidable longitudinally through said shaft for movement of said plunger transversely across said belt to eject fruit, a spring normally retracting said plunger, rotatable means normally free from said stem for actuating the latter, and a gate device adapted for actuation by the fruit and provided with means for rocking said shaft to dispose said stem into operative relation with said rotatable means for actuating said plunger.

4. In a fruit sizing apparatus, a conveyor trough, a fruit advancing belt therein, normally idle mechanism for ejecting fruit from said belt, and a gate in said trough provided with a yieldingly mounted member adapted to be engaged by the fruit to operate said gate and initiate operation of said mechanism to eject a fruit entity.

5. In a fruit sizing apparatus, a conveyor trough, a fruit advancing belt therein, normally idle mechanism for ejecting fruit from said belt, and a substantially vertically disposed gate in said trough provided on its lower end with a fruit engaging member mounted to yield upward and resist yielding movement laterally to operate said gate and initiate operation of said mechanism.

6. In a fruit sizing apparatus, a conveyor trough, a fruit advancing belt therein, normally idle mechanism for ejecting fruit from said belt, and a gate on said trough for initiating operation of said mechanism, said gate being substantially vertically disposed and having on its lower end a bar for engagement by the fruit, said bar having one end hinged to said gate and the other end yieldingly connected to said gate.

7. In a fruit sizing apparatus, a conveyor trough, a fruit advancing belt therein, normally idle fruit ejecting mechanism, and a gate structure for initiating operation of said mechanism and comprising a substantially vertically disposed supporting member mounted to oscillate in said trough, a gate member longitudinally adjustable on said supporting member, and adjusting means for altering the relation of the lower end of said gate member with respect to said belt.

8. In a fruit sizing apparatus, a conveyor trough, a fruit advancing belt therein, normally idle fruit ejecting mechanism, a gate shaft rotatively mounted on said trough, and a gate structure for initiating operation of said mechanism and comprising a substantially vertically disposed supporting member, means for rotatively anchoring the latter to said shaft, a gate member longitudinally slidable on said member, and means for adjusting and holding said gate member in various positions on said supporting member.

In witness whereof, I have hereunto set my hand.

EDWARD A. WHITE.